United States Patent Office 3,309,936
Patented Mar. 21, 1967

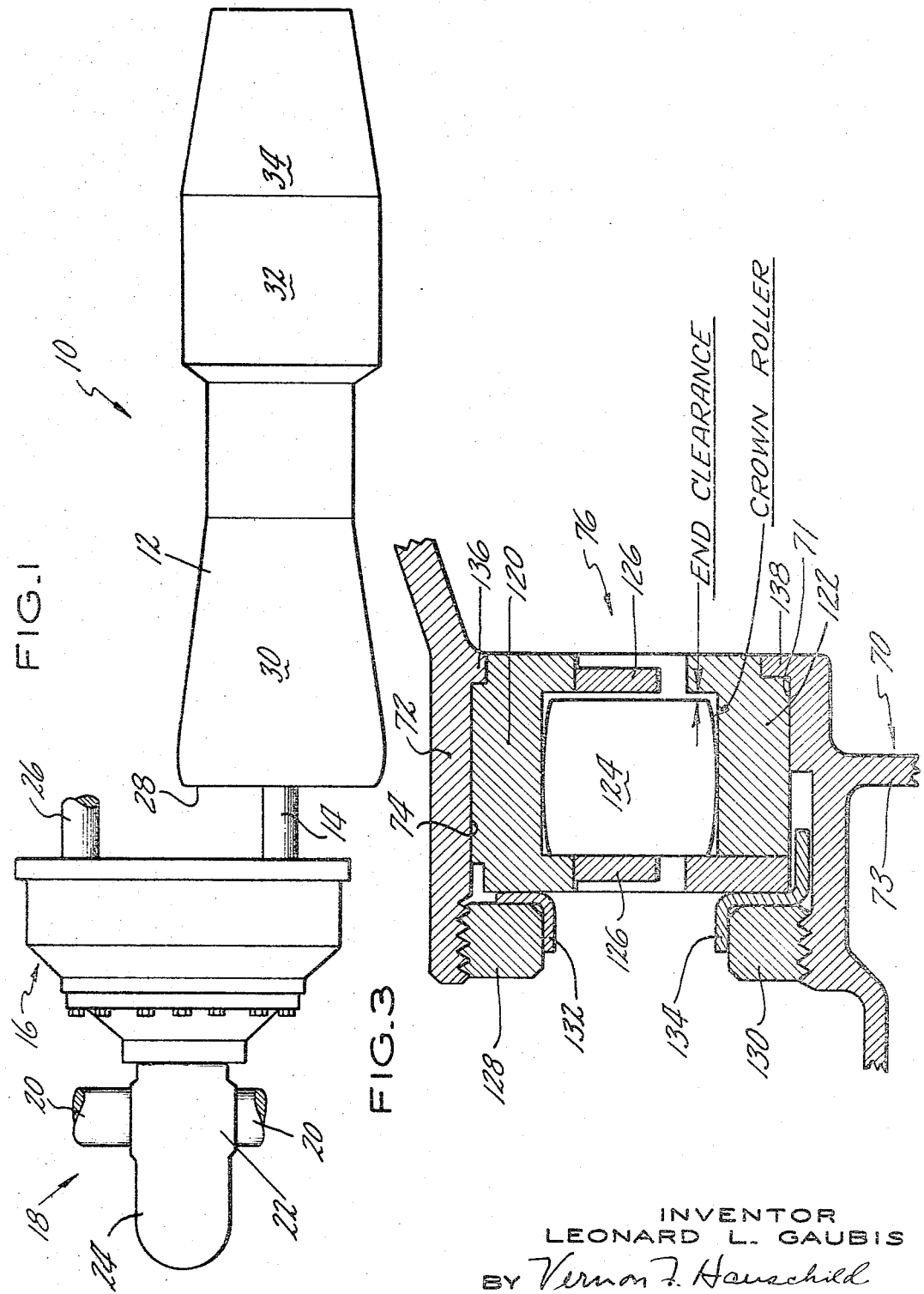

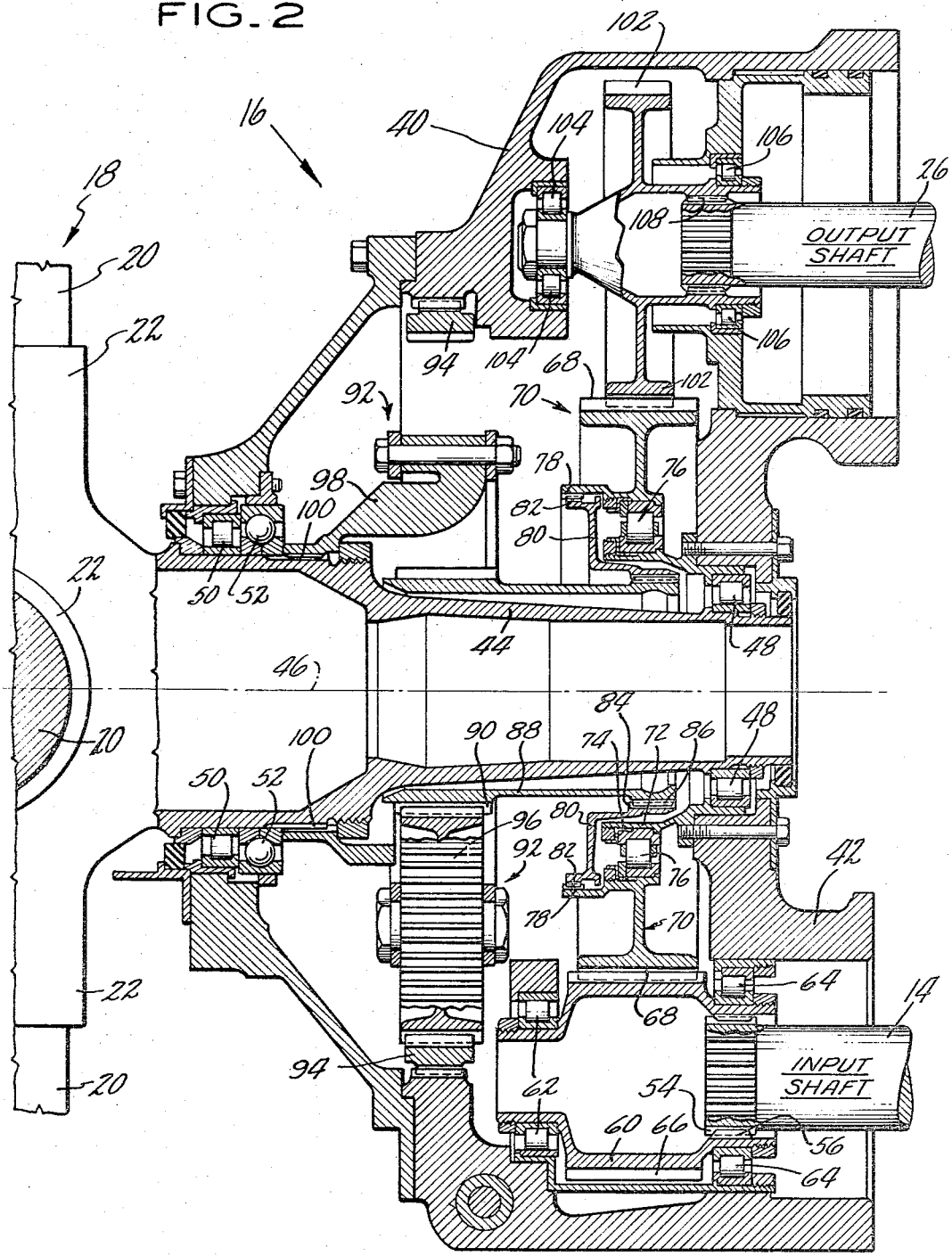

3,309,936
REDUCTION GEAR CONSTRUCTION
Leonard L. Gaubis, East Granby, Conn., assignor to United Aircraft Corporation, East Hartford, Conn., a corporation of Delaware
Filed Oct. 8, 1964, Ser. No. 402,589
7 Claims. (Cl. 74—410)

This invention relates to reduction gearing and more particularly to reduction gearing for use between a flight engine and an aeronautical propeller.

In reduction gearing for flight use, it is essential that the gearing be light in weight, highly reliable from a safety standpoint, capable of withstanding vibrations and loads imparted thereto from the propeller and the engine, capable of transmitting high torque loads, and capable of withstanding the loading and misalignment caused by G or flight maneuver loading of the associated parts.

When two gears of the spur or herringbone type are placed in drive relation to one another, the gears will be properly and uniformly loaded when the gear axes are parallel and properly spaced from one another. This condition of gear axes paralellism and selected spacing is difficult to achieve and maintain because of manufacturing tolerances in the gearing and the gear support system, because of wear which takes place during operation, and further because of loading and vibrations which are imparted to the mating gears from the associated gear parts in the remainder of the reduction gear system, from the engine and from the propeller, and still further due to thermal growth of the related parts and due to deflections in the gear mounting structure resulting from maneuver loading.

It is an object of this invention to teach a flight reduction gear system including an input and output gear combination which are light in weight, reliable, capable of withstanding vibrations and accomplish an evenly distributed gear tooth loading in view of the fact that at least one of the gears is mounted on a flexible roller bearing which is self-aligning within selected limits.

It is still a further object of this invention to teach a gear mounting for a flight reduction gear in which the gear is mounted from the reduction gear housing on a sleeve cantilevered therefrom and ground at assembly to be precisely sized and positioned with regard to the parts with which the gear will mate. In this arrangement, a flexible roller bearing is positioned between the gear and the sleeve and has crowned rollers and selected end clearance between the bearing races and rollers, which clearance is selected to provide the bearing with the degree of flexibility it will need to compensate for misalignment of parts, vibrations, wear and loading which will be imparted thereto.

Other objects and advantages will be apparent from the following description taken in conjunction with the attached drawings which are:

FIG. 1 is a showing of my reduction gear unit positioned between a flight engine and an aeronautical propeller.

FIG. 2 is an enlarged cross-sectional view showing of my reduction gear unit.

FIG. 3 is a still further enlarged cross sectional showing of the flexible or self-aligning bearing on which my gear is mounted.

Referring to FIG. 1 we see turbo-prop power plant 10 which includes turbine engine 12 attached through drive shaft 14 and preferably a conventional clutch (not shown) to reduction gear 16. The reduction gear is connected to aeronautical propeller 18, which includes a plurality of rotatable blades 20 mounted for rotation on propeller hub 22. Pitch change motor 24 varies the angularity or pitch of the blades. Cross-shaft 26 is driven by reduction gear 16 to perform a related function such as driving a second propeller comparable to 18. Shaft 26 could also be connected to a second engine which drives propeller 18 when engine 12 fails.

Engine 12 is of conventional design and includes air inlet 28, compressor section 30, burner section 32 and turbine section 34. Engine 12 will be of the type more fully described in United States Patents Nos. 2,711,631 or 2,747,367. Engine 12 may also be a piston engine of the type more fully described in United States Patent No. 2,426,879, each of which patents are hereby incorporated by reference. Pitch change motor 24 may be of the type more fully described in United States Patent No. 3,163,231 or of the type taught in United States Patent Number 3,154,454, which patents are hereby incorporated by reference.

Referring to FIG. 2 we see my reduction gear 16 in greater particularity. Reduction gear unit 16 is enclosed within housing 40 which includes rear support bulkhead 42. Propeller tail shaft 44 projects rearwardly from propeller hub 22, is concentric about axis or centerline 46 and is supported at its after end in support bulkhead 42 by anti-friction bearing 48. Tail shaft 44 is supported at its forward end in housing 40 by roller bearing 50 and thrust bearing 52.

Engine driven shaft 14 includes spline 54 which engages mating splines 56 on input gear 60. Input gear 60 is supported in housing 40 and bulkhead 42 between anti-friction bearings 62 and 64. The gear teeth 66 of input gear 60 are connected to or mate with in driving fashion the teeth 68 of driven gear 70. Driven gear 70 is supported from support bulkhead 42 by sleeve 72 which is cantilevered therefrom and which includes cylindrical support surface 74, which is ground at assembly for proper dimension and positioning with respect to the related gears such as input gear 60. Flexible or self-aligning roller bearing 76 is carried on surface 74 of sleeve 72 and is positioned between sleeve 72 and gear 70 to engage the inner diameter 71 of gear hub 73 to support gear 70 for rotation with respect to sleeve 72 and bulkhead 42. Gear 70 includes splined gear 78 projecting therefrom, which engages flexible member 80 in drive relation. Flexible member 80 includes splines 82 which mate with splined gear 78 and also includes splines 84 which mate with corresponding splines 86 on shaft or sleeve 88. Sun gear 90 is located at the opposite end of sleeve 88. Sun gear 90 is part of planetary gear system 92 and co-acts with fixed ring gear 94 to support pinion gears 96 for planetary rotation therebetween. Pinion cage 98 is attached to and rotates with planetary gears 96 and projects forwardly thereto to engage propeller tail shaft 44 at inter-connecting splines 100.

Output gear 102 is supported for rotation within housing 40 between anti-friction bearings 104 and 106 and mates with gear 70 to drive or be driven thereby and is connected through mating splines 108 to drive or be driven by cross-shaft 26.

It will be noted that propeller shaft 44, gear 70 and planetary gear system 92 are concentrically mounted about axis 46.

With the gears mounted as described above, engine 12 drives input gear 60 through shaft 14. Input gear 60 mates with and drives gear 70 which in turn drives sun gear 90 of planetary gear system 92 through flexible member 80 and sleeve 88. The rotation of sun gear 90 with respect to fixed gear 94 causes pinions 96 to rotate and revolve about axis 46 in planetary fashion and causes pinion cage 98 to rotate with and drive propeller shaft 44 through splines 100. Since propeller shaft 44 is attached to propeller hub 22, which in turn carries the blades of propeller 20, the rotation of propeller shaft 44 causes the rotation of propeller 20 about axis 46. The rotation of gear 70 causes gear 102 to rotate and drive shaft 26 to perform some related function such as the driving of a second propeller comparable to 18. Also, cross-shaft 26 may be driven by a second engine to drive gear 70 and propeller 18 when engine 12 fails.

As previously mentioned, anti-friction bearing 76 is made to be flexible, floating or self-aligning so that gear 70 is capable of aligning with input gear 60 or output gear 102 to effect full gear tooth loading of these associated gears and to compensate for misalignment therein due to vibration, maneuver and torque loading, and wear.

Flexible or self-aligning bearing 76 is shown in greater particularity in FIG. 3. Bearing 76 is shown therein to be positioned between ground cylindrical surfaces 74 of a cantilevered sleeve 72 and gear 70. Bearing 76 includes fixed inner race 120 and rotatable outer race 122 which have a plurality of circumferentially positioned and spaced crowned rollers 124 positioned or rotated therebetween. Cage 126 spaces and positions crowned rollers 124 and rotates therewith while sliding on fixed inner race 120. Conventional retention means such as nuts 128 and 130 together with nut retaining cups 132 and 134 may be used to retain races 120 and 122 in position against shoulders 136 and 138 of sleeve 72 and gear 70, respectively.

It will be noted that rollers 124 are crowned so that they are able to move in rocking fashion with respect to races 120 and 122 and thereby permit gear 70 to rock with respect to axis 46. A selected end clearance exists between rollers 124 and races 120 and 122 so that selected axial motion is permitted between the races and the rollers and hence axial motion of gear 70 is permitted. The degree of end clearance is determined by mathematical means to compensate for the amount of distortion, wear, thermal growth and the like to which gear 70 will be subjected. For example, when a gear of 14.0 inches diameter is used in a reduction gearing and propeller system with a General Electric T-64 engine for the Chance-Vought XC-142 aircraft, the end clearance was calculated to be .028".

While a driven gear 70 is illustrated herein as floating bearing mounted, it should be borne in mind that a drive gear such as 60 could also be so mounted.

It is to be understood that the invention is not limited to the specific embodiment herein illustrated and described but may be used in other ways without departure from its spirit as defined by the following claims.

I claim:

1. In a reduction gear system, a housing, a first gear, means supporting said first gear from said housing, a second gear connected to drive said first gear, a planetary gear system, means to support said planetary gear system, flexible drive means connecting said first gear and said planetary gear system, said first gear support means including a flexible support bearing engaging and supporting said first gear.

2. Apparatus according to claim 1 wherein said first gear support means includes a cylindrical support sleeve projecting from said housing in cantilever fashion and a flexible anti-friction bearing between said sleeve and said first gear.

3. Apparatus according to claim 2 wherein said bearing is a crowned roller bearing with selected end play between the races and rollers thereof.

4. A flight engine, an aeronautical propeller, a reduction gear system connecting said engine to said propeller, said reduction gear system including a housing with a support bulkhead, a driven gear, support means supporting said driven gear from said support bulkhead, a drive gear driven by said engine and connected to drive said driven gear, a planetary gear system connected to drive said propeller, and drive means connecting said driven gear to said planetary gear system, said support means including a cylindrical support sleeve cantilevered from said bulkhead and a self-aligning roller bearing between and engaging said sleeve and said driven gear.

5. Apparatus according to claim 4 wherein said drive gear is supported by said housing and wherein said propeller includes a tailshaft supported by said housing.

6. Apparatus according to claim 5 and including a third gear supported by said housing and connected to drive said driven gear when said drive gear is not driving said driven gear.

7. In combination, a housing, a cylindrical support extending from and supported by said housing, a first gear surrounding said support and having a hub with an inner diameter in spaced relation thereto, an anti-friction bearing having an inner race sleeved over said cylindrical support and an outer race received in said hub inner diameter and further having crowned rollers selectively shorter than said inner and outer race to provide end-clearance therebetween, and a second gear mounted to engage said first gear.

References Cited by the Examiner

UNITED STATES PATENTS

| | | | |
|---|---|---|---|
| 2,737,018 | 3/1956 | Bain | 170—135.75 X |
| 2,883,874 | 4/1959 | Bynum | 74—410 X |
| 2,936,655 | 5/1960 | Peterson | 74—410 X |
| 2,939,346 | 6/1960 | McCarthy | 74—411 X |

MARK NEWMAN, *Primary Examiner.*

RALPH D. BLAKESLEE, *Examiner.*